(12) United States Patent
Sibert et al.

(10) Patent No.: US 8,126,140 B2
(45) Date of Patent: Feb. 28, 2012

(54) GENERATION OF A PSEUDORANDOM DATA SEQUENCE

(75) Inventors: Herve Sibert, Le Mans (FR); Aline Gouget, Paris (FR)

(73) Assignees: France Telecom, Paris (FR); Universite de Caen Basse Normandie, Caen (FR)

( * ) Notice: Subject to any disclaimer, the term of this patent is extended or adjusted under 35 U.S.C. 154(b) by 373 days.

(21) Appl. No.: 11/659,052

(22) PCT Filed: Aug. 2, 2004

(86) PCT No.: PCT/FR2004/002070
§ 371 (c)(1),
(2), (4) Date: Jan. 30, 2009

(87) PCT Pub. No.: WO2006/024705
PCT Pub. Date: Mar. 9, 2006

(65) Prior Publication Data
US 2009/0154700 A1 Jun. 18, 2009

(51) Int. Cl.
*H04L 9/00* (2006.01)
(52) U.S. Cl. .......................................... 380/46; 708/250
(58) Field of Classification Search .................... 380/46; 708/250
See application file for complete search history.

(56) References Cited

U.S. PATENT DOCUMENTS

| 3,936,601 | A | * | 2/1976 | Obeginski | 709/225 |
| 2003/0081775 | A1 | | 5/2003 | Campagna et al. | |
| 2009/0313397 | A1 | * | 12/2009 | England et al. | 710/22 |

FOREIGN PATENT DOCUMENTS

| CN | 1302497 A | 7/2001 |
| DE | 197 36 954 A | 8/1999 |
| EP | 0 905 611 A | 3/1999 |
| EP | 1 258 799 | 11/2002 |
| EP | 1 258 799 A | 11/2002 |
| EP | 1 571 546 | 9/2005 |
| JP | 10-229330 | * 8/1998 |
| JP | 2004-164482 | 6/2004 |
| WO | WO 99/16208 | 4/1999 |

OTHER PUBLICATIONS

Meier et al., "The Self Shrinking Generator", Lecture Notes in Computer Science: Advances in Cryptology, vol. 950/1995. 1995, pp. 1-10.*
XP002311267, Bordélisateur lexigraphique ambient Bla. exe http://jlpfactware.free.fr/outils.htm.
Schneier, "Psuedo-Random-Sequence Generators and Stream Ciphers", Applied Cryptography. Protocols, Algorithms, and Source Code INC, New York, John Wiley & Sons, pp. 369-428, 1996.
Knuth, "The art of computer programming", Addison Wesley Longman, pp. 1-40, 1998.

* cited by examiner

*Primary Examiner* — Nasser Moazzami
*Assistant Examiner* — Lisa Lewis
(74) *Attorney, Agent, or Firm* — Cozen O'Connor (57) ABSTRACT

A method of generating a pseudorandom data sequence, wherein said pseudorandom data sequence is generated by a procedure for searching for a search pattern in an initial data sequence of N bits, said search procedure comprising the following steps: (a) detecting in said initial data sequence a particular search pattern of r bits that is one of a set of search patterns; (b) determining an output pattern of k bits by an operation that depends on the progress of the preceding step; and repeating the preceding steps (a) and (b) successively to form the pseudorandom data sequence from a succession of output patterns.

15 Claims, 5 Drawing Sheets

GENERATION OF A PSEUDORANDOM DATA SEQUENCE

RELATED APPLICATIONS

This is a U.S. National Phase Application under 35 USC 371 of International Application PCT/FR2004/002070, filed on Aug. 2, 2004.

FIELD OF THE INVENTION

The invention relates to the field of coding/decoding and concerns a system and a method of generating a pseudorandom data sequence.

The invention finds a very advantageous application in that it serves to create sequences of bits intended for symmetrical encryption, where encryption and decryption use the same secret key. It fits into the standard stream encryption method wherein the encryption operation and the decryption operation are identical. Symmetrical encryption is routinely used in all types of communications, such as mobile communications (GSM, UMTS, etc.), the Internet (SSL, etc.), smart cards (bank cards), etc.

BACKGROUND OF THE INVENTION

The most widespread stream encryption method generates an encryption series independently of the message to be encrypted using linear feedback shift registers, to economize on hardware.

The major drawback of linear feedback shift registers is their linearity. In fact, knowing a number of output bits of the register equal to the length of the register, and knowing the feedback polynomial associated with the register, makes it possible to determine the output bits and all subsequent states of the register.

Accordingly, to "break" the linearity of linear feedback shift registers, it is standard practice to combine the outputs of a plurality of registers, and possibly also their internal state, for example using a non-linear Boolean function.

Figure 7:
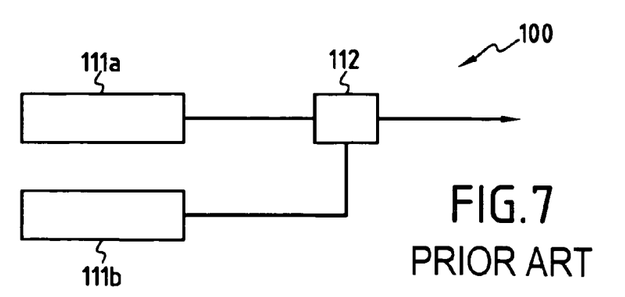
FIG. 7 is a highly diagrammatic view of a prior art generator.

FIG. 7 shows such a generator 100, known as a "shrinking generator", described in European Patent Application EP 0 619 659, including a first linear feedback shift register 111a, a second linear feedback shift register 111b, and means 112 for selecting the output of the generator 100.

Accordingly, on each shift, the two registers 111a and 111b are shifted simultaneously; the output of the device 100 is equal to the output of the second register 111b if the output of the first register 111a is a 1; otherwise there is no output.

The shrinking generator combines not only the outputs of two linear feedback registers but also, and more generally, any pair of series of bits. The shrinking generator is in a class of stream encryption methods in which one linear feedback register controls another. The idea is to vary the number of shifts firstly between the various registers employed and secondly between two consecutive bits, in order to break the linearity of the registers.

A variant of the shrinking generator known as the "self-shrinking generator" is based on the same principle but uses a single register. The output bits of the register are read two by two; the first bit controls the output of the second so that the output of the system is the second bit if the first is a 1; otherwise there is no output.

Using only linear feedback registers has many drawbacks. The main one is the weakness stemming from the linearity of the device. There are also disadvantages if registers are combined by means of a Boolean function. At the hardware level, these disadvantages stem from the complexity of implementing the function. Moreover, this function is fixed and it is possible to attack it.

Moreover, statistical methods have highlighted certain weaknesses of the shrinking generator and other clock-controlled encryption methods. In particular, in the shrinking generator the number of shifts effected by the two registers between two output bits varies by the same amount for both registers.

Finally, a last drawback of the shrinking generator is its low ratio of the number of output bits to the number of bits computed, which on average is equal to ¼. This ratio is the same for the self-shrinking generator, which has most of the vulnerability of the shrinking generator.

OBJECT AND SUMMARY OF THE INVENTION

An object of the invention is to remedy the above drawbacks and to simplify the generation of a pseudorandom data sequence of good quality.

Another object is to propose a method and a generator yielding a ratio between the number of output bits and the number of bits computed greater than ¼.

A further object is to provide a very efficient generator of low cost.

These and other objects are attained in accordance with one aspect of the invention directed to a method of generating a pseudorandom data sequence, wherein said pseudorandom data sequence is generated by a procedure for searching for a search pattern in an initial data sequence of N bits, said search procedure comprising the following steps: (a) detecting in said initial data sequence a particular search pattern of r bits that is one of a set of search patterns; (b) determining an output pattern of k bits by an operation that depends on the progress of the preceding step; and
repeating the preceding steps (a) and (b) successively to form the pseudorandom data sequence from a succession of output patterns.

Another aspect of the invention is directed to a method of generating a pseudorandom data sequence in which said pseudorandom data sequence is generated by a procedure of searching for a search pattern in an initial data sequence of N bits.

Thus the method according to an embodiment of the invention relates to a non-linear method of generating pseudorandom data based on the detection of patterns enabling non-linear combination of one or more bit streams to obtain a new bit stream.

This method, while being simple to implement, has intrinsic complexity in order to produce a pseudorandom data sequence of good quality.

The search procedure comprises the following steps:
  detecting in said initial data sequence a particular search pattern of r bits that is one of a set of search patterns;
  determining an output pattern of k bits by an operation that depends on the progress of the preceding step; and
  repeating the preceding steps successively to form the pseudorandom data sequence from a succession of output patterns.

The step of detecting said search pattern and the step of determining said output pattern are effected by a series of operations involving a first set of rules for defining a shift mode for shifting a window over said initial data sequence to detect said search pattern, said window having a particular initial position on said initial data sequence and a particular size in bits.

The series of operations further involves a second set of rules that determine the conditions for stopping the shifting of said window over said initial data sequence.

A rule from said second set of rules manages updating of said set of search patterns and/or of said output pattern as a function of the shifting and/or the content of said window.

The series of operations may be repeated until a predetermined condition is met.

The series of operations is advantageously modified after each execution.

According to a feature of the invention, the series of operations remains the same after each execution and shifts a window of 1 bit over said initial data sequence continuously bit by bit to detect a search pattern of 1 bit and to determine an output pattern of 1 bit.

In a first implementation of the invention, the series of operations includes the following steps:
   placing the bit from a window in the search pattern;
   shifting the window by one bit, from the current bit to the next bit;
   updating the output pattern in accordance with a first law if the content of the window is equal to that of the search pattern;
   updating the output pattern according to a second law if the content of the window is not equal to the bit of the search pattern;
   shifting the window bit by bit toward the next bit if the content of the window is not equal to the bit of the search pattern;
   shifting the window by one bit, from the current bit to the next bit; and
   outputting the output pattern.

In the first implementation, the first law assigns a particular value b to the output pattern and the second law effects modulo 2 addition of said particular value b and the value 1 and assigns the result of said addition to the output pattern.

In a second implementation, the first law effects modulo 2 addition of a particular value b and the value E of the search pattern and assigns the result of said addition to the output pattern and the second law effects modulo 2 addition of said particular value b, the value E of the search pattern, and the value 1 and assigns the result of said addition to the output pattern.

In a third implementation, the series of operations includes the following steps:
   placing the bit from a first window in the search pattern;
   shifting the first window by one bit, from the current bit to the next bit;
   updating the output pattern by assigning to it the result of modulo 2 addition of a first particular value b, and the value E of the search pattern if the content of the first window is equal to the value of the search pattern;
   updating the output pattern by assigning it the result of modulo 2 addition of said first particular value $b_1$, the value E of the search pattern, and the value 1 if the content of the first window is not equal to value E of the search pattern;
   shifting the first window bit by bit toward the next bit if the content of the first window is not equal to the bit E of the search pattern;
   shifting the first window by one bit, from the current bit to the next bit;
   replacing the value of the search pattern by the bit from a second window;
   shifting the second window by one bit, from the current bit to the next bit;
   updating the output pattern by assigning to it the result of modulo 2 addition of a second particular value $b_2$, the current value s of the output pattern, and the value E of the search pattern if the content of the second window is equal to the value of the search pattern;
   updating the output pattern by assigning to it the result of modulo 2 addition of the current value s of the output pattern, said second particular value $b_2$, the value E of the search pattern, and the value 1 if the content of the second window is not equal to the value of the search pattern;
   shifting the second window bit by bit toward the next bit if the content of the second window is not equal to the value of the search pattern;
   shifting the second window by one bit, from the current bit to the next bit; and
   outputting the output pattern.

In an application of the present invention, each bit of said pseudorandom data sequence is combined with a corresponding bit of a data sequence of a message to be encrypted by modulo 2 addition to form an encrypted data sequence.

Another aspect of the invention is directed to a generator of a pseudorandom data sequence that includes search means for searching for a search pattern in an initial data sequence of N bits.

The search means of the generator include:
   detection means for detecting in said initial data sequence a particular search pattern of r bits that is one of a set of search patterns;
   determination means for determining an output pattern of k bits according to an operation that depends on the progress of the detection of said search pattern; and
   repetition means for generating the pseudorandom data sequence from a succession of output patterns.

The detection means include a window adapted to be shifted over said initial data sequence and first control means for controlling the shifting of said window over said initial data sequence.

The determination means include second control means for updating said set of search patterns and/or said output pattern.

The generator further includes initial means for generating the initial data sequence of N bits.

The initial means may include a linear feedback shift register.

Another aspect of the invention is directed to a coding device including an exclusive-OR logic gate and a generator having the above features.

Another aspect of the invention is directed to a secure system including at least two entities each of which includes a coding device.

BRIEF DESCRIPTION OF THE DRAWINGS

Other features and advantages of the invention emerge from a reading of the description given below by way of non-limiting example and with reference to the appended drawings, in which.

DETAILED DESCRIPTION OF THE DRAWINGS

Figure 1:
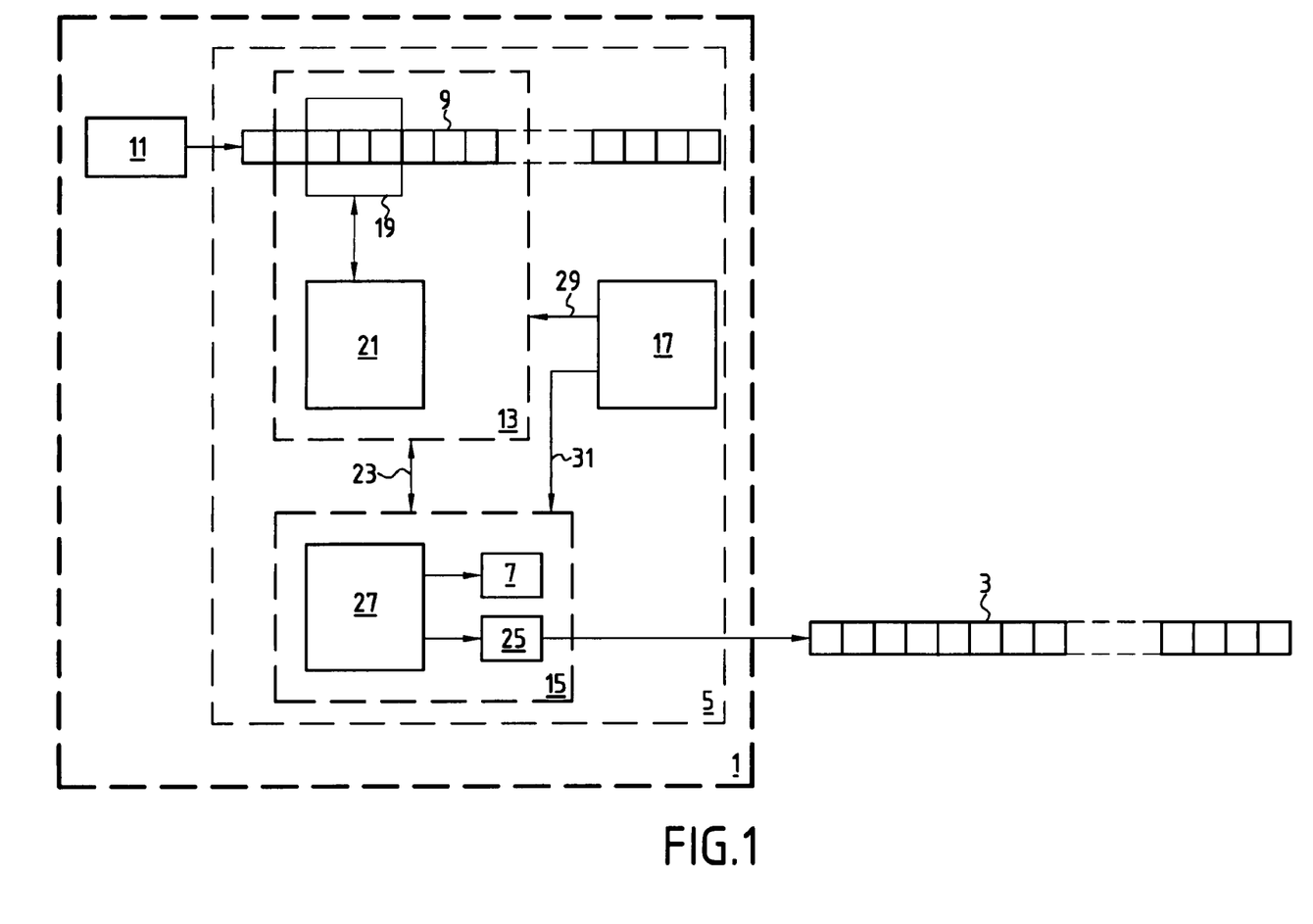
FIG. 1 shows highly schematically an example of a pseudorandom data sequence generator according to the invention.

FIG. 1 shows highly schematically an example of a generator 1 according to the invention for generating a pseudorandom data sequence 3.

The generator 1 includes search means 5 for searching for a search pattern 7 in an initial data sequence 9 of N bits. The search pattern is included in a set of search patterns.

The term "pattern" is used below to mean any word made up exclusively of 0s and 1s. For example, 0, 11, 000, 1010, 00111 are patterns with respective lengths of 1, 2, 3, 4 and 5. Moreover, an "empty" pattern is an empty word.

The initial data sequence of N bits (N being an integer) is generated by initial means 11 that may include a linear feedback shift register of maximum period.

A linear feedback shift register is a table of bits of finite length (the register) provided with a linear combination of the table entries, represented by a polynomial called the feedback polynomial. On each shift, the bit with the highest index is output, all the other bits are shifted by one index, and the bit with the lowest index takes the value of the linear combination before the shift.

The feedback polynomial may advantageously be a primitive polynomial corresponding to a linear shift register of maximum period, for example, or a polynomial of the form $Q=(x^2+1)P$, where P is a primitive polynomial.

The search means 5 of the generator 1 include detection means 13, determination means 15, and repetition means 17.

The detection means 13 detect a search pattern 7 of r bits in the initial data sequence, where r is an integer less than N. The determination means 15 define the set of search patterns to which the search pattern 7 detected by the detection means 13 belongs.

The detection means include a window 19 adapted to be shifted over the initial data sequence 9 and first control means 21 for controlling the shifting of the window 19 over the initial data sequence 9.

Each window 19 is placed at a particular initial position in the initial data sequence 9 and has a particular size in bits. For example, a window 19 of size t (t being an integer less than N) placed on the initial data sequence 9 is a mask that can be shifted over the sequence 9 to expose on each shift exactly t bits of the sequence 9.

The determination means 15 interact with the detection means 13 via a connection 23. The determination means 15 determine an output pattern 25 of k bits (k being an integer less than N) by an operation that depends on the progress of the search for the search pattern 7.

In fact, the determination means 15 include second control means 27 for defining or updating the set of search patterns and/or the output pattern 25.

Moreover, the repetition means 17 are connected to the detection means 13 and the determination means 15 via connections 29 and 31, respectively.

Accordingly, the repetition means 17 can exchange signals with the detection means 13 and the determination means 15 to resume the detection and determination operations, provided that a predetermined stopping condition is not met, for example after receiving from the determination means 15 a signal to the effect that an output pattern 25 has just been output. The repetition means 17 may additionally test the stopping condition by exchanging signals with the detection means 13 and the determination means 15. This generates a succession of output patterns 25 that by concatenation form the pseudorandom data sequence 3.

It should be noted that the repetition means 17 may also be integrated into the first or second control means 21 or 27 of the detection means 13 and the determination means 15.

Figure 2:
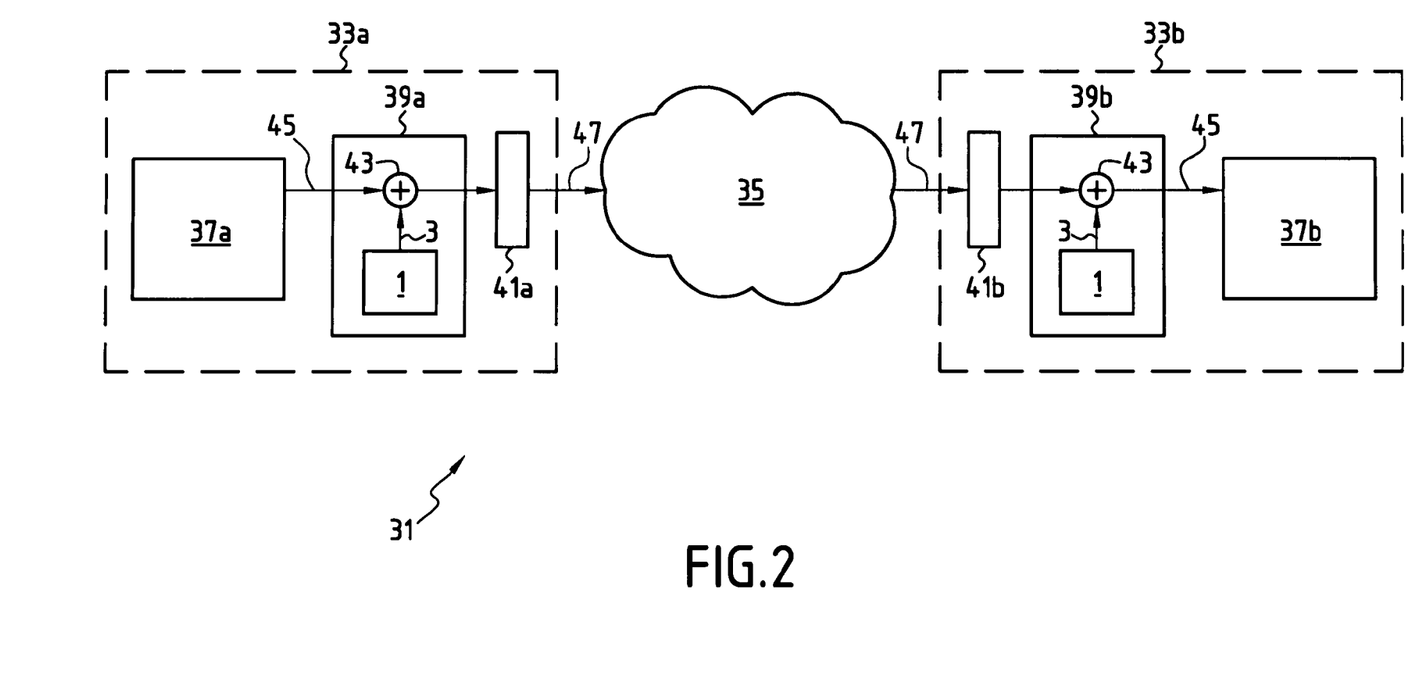
FIG. 2 shows a secure system including generators from FIG. 1.

FIG. 2 shows a secure system 31 including at least two entities interconnected via an Internet, GSM, UMTS, etc. type communication network 35.

The example from this figure shows a first entity 33a connected via the communication network 35 to a second entity 33b. The first entity 33a (respectively the second entity 33b) includes a first terminal 37a (respectively a second terminal 37b), a first coding device 39a (respectively a second coding device 39b), and a first modem 41a (respectively a second modem 41b), the modems 41a and 41b consisting of any device for interfacing with the communication network 35.

Each of the first and second coding devices 39a, 39b includes a generator 1 for generating a pseudorandom data sequence 3 as described above and an exclusive-OR logic gate 43.

Each coding device 39a, 39b performs stream encryption or decryption, which consists in encrypting or decrypting a message bit by bit.

In this example, the first coding device 39a performs an encryption operation. Accordingly, the pseudorandom data sequence 3, called the encryption series, is combined by the exclusive-OR gate 43 with each bit at the corresponding position in a message 45 in clear sent by the first terminal 37a to obtain an encrypted text 47 which is then sent by the first modem 41a to the second entity 33b. Thus the encryption operation consists in adding an encryption series 3 to the clear text of the message 45 bit by bit to obtain the encrypted text 47.

The second coding device 39b performs a decryption operation which consists in adding the same encryption series 3 bit by bit to the encrypted text 47 sent by the first entity 33a to reformulate the text message 45 in clear.

Thus the encryption and decryption operations are identical.

FIGS. 3 to 6 show the method according to the invention of generating pseudorandom data.

This method consists in generating the pseudorandom data sequence 3 from a procedure for searching for a search pattern in the initial data sequence 9.

Accordingly, determination in accordance with the invention of the elements of the pseudorandom data sequence may depend on the pattern searched for and the history of the search or the manner in which it has been conducted.

Figure 3:
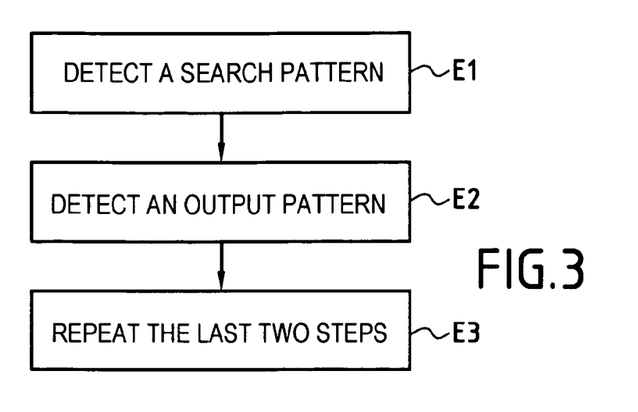
FIG. 3 shows an example of a search procedure for generating the pseudorandom data sequence in accordance with the invention.

FIG. 3 shows an example of a search procedure for generating the pseudorandom data sequence 3 in accordance with the invention.

The step E1 concerns the detection in the initial data sequence 9 of a particular search pattern 7 of r bits which is one of a set of search patterns.

The step E2 concerns the determination of an output pattern 25 of k bits by an operation that depends on the progress of the preceding step E1.

In fact, the determination of the output pattern 25 may depend on the search pattern 7 and on the history of the search, in particular on the number of steps or iterations effected before finding the search pattern 7 in question in the initial data sequence 9.

The step E1 of detecting the search pattern 7 and the step E2 of determining the output pattern 25 are effected by a series of operations.

This series of operations involves a first set of rules implemented by the first control means 21 of the generator 1 for defining a shift mode for shifting a window 19 over the initial data sequence 9 to detect the search pattern 7.

One or more windows 19 of non-null size are generally sifted over the initial data sequence 9. At the beginning of the search procedure, each window 19 is at an initial position on the initial sequence 9 (they may all be at the beginning of the initial sequence 9, for example). The bit(s) in the window(s) 19 are used to determine the output pattern 25.

The first set of rules may define the shift direction, the shift amplitude, or the form of shifting the window 19, for example a cyclic shift over a portion of the initial data sequence 9.

For example, the first set of rules may include a rule $r_1$ defined as follows:

$r_1$="shift one bit to the right".

Moreover, the series of operations involves a second set of rules implemented by the second control means 27 of the generator 1 that determine conditions for stopping the shifting of the window 19 over the initial data sequence 9.

The second set of rules may include rules that must be applied in a particular order before the generator 1 delivers the output pattern 25. Thus the delivery by the generator 1 of a succession of output patterns 25 forms the pseudorandom data sequence 3.

For example, the second set of rules may include a rule $r_2$ defined as follows:

$r_2$="so while the content of a window 19 is not a pattern from the set of search patterns 7, shift the window 19 according to the rule $r_1$", where $r_1$ is a rule from the first set of rules.

Moreover, another rule from this second set of rules manages updating of the set of search patterns 7 and/or the output pattern 25 in accordance with a given binary law and as a function of the shifting and/or the content of the window 19.

Accordingly, the search pattern 7 may be empty, i.e. with no pattern, depend on the content of the window 19 or depend on preceding executions of the series of operations involving the first and second sets of rules.

Similarly, the output pattern 25 may be empty, i.e. with no pattern, depend on the content of the windows 19 or depend on preceding executions of the series of operations involving the first and second sets of rules.

Moreover, the step E3 of the search procedure repeats the foregoing two steps E1 and E2 successively to form the pseudorandom data sequence 3 from a succession of output patterns 25 by concatenation.

It should be noted that the series of operations may be repeated until a predetermined condition is met. That condition may be the content of a window 19 of the initial data sequence 9, if it is finite. It is also possible to repeat the series of operations until a condition defined by the user is met.

Moreover, it is possible to modify the series of operations after each execution, in order to improve further the quality of the pseudorandom data sequence 3.

Accordingly, this method consists in scanning an initial bit stream (initial data sequence 9) using one or more windows 19, so that each output bit of the pseudorandom data sequence 3 depends on one or more searches for one or more patterns 7 in the initial stream 9. Moreover, the pattern(s) 7 to be searched for may depend on the content and/or the shifting of the window(s) 19.

Figure 4:
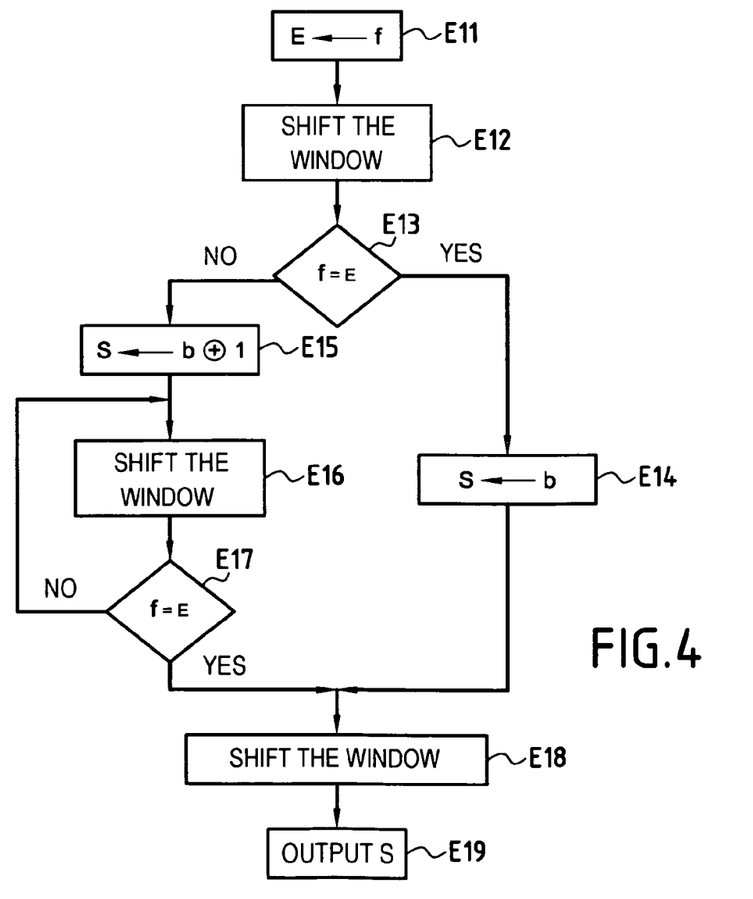
FIGS. 4 to 6 show particular implementations of the method according to the invention.
Figure 5:
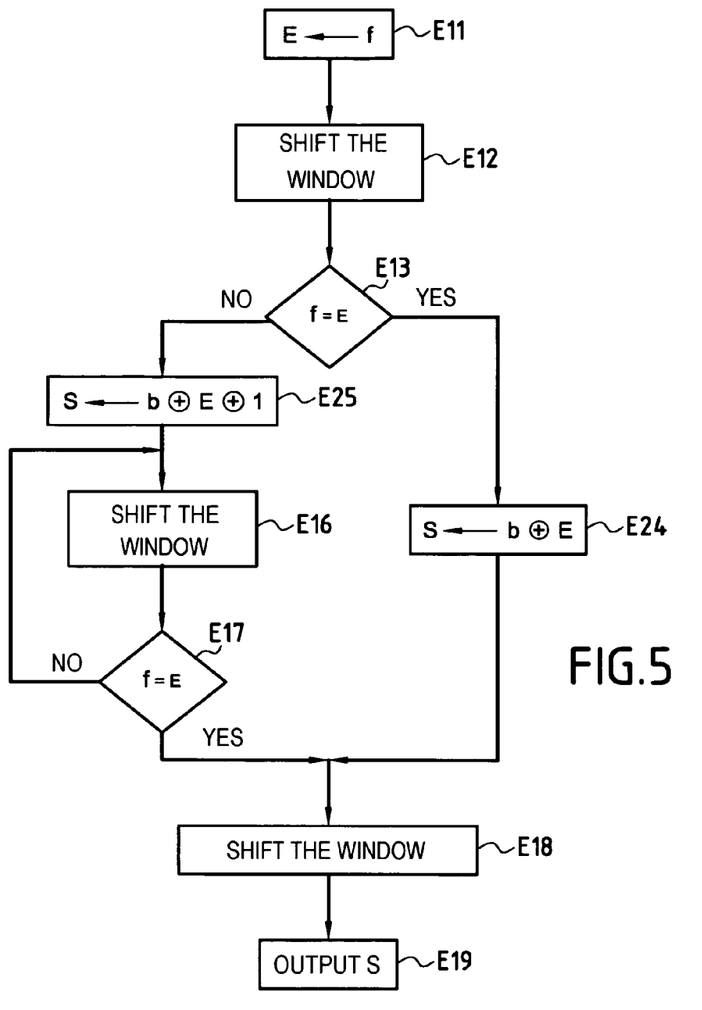
Figure 6:
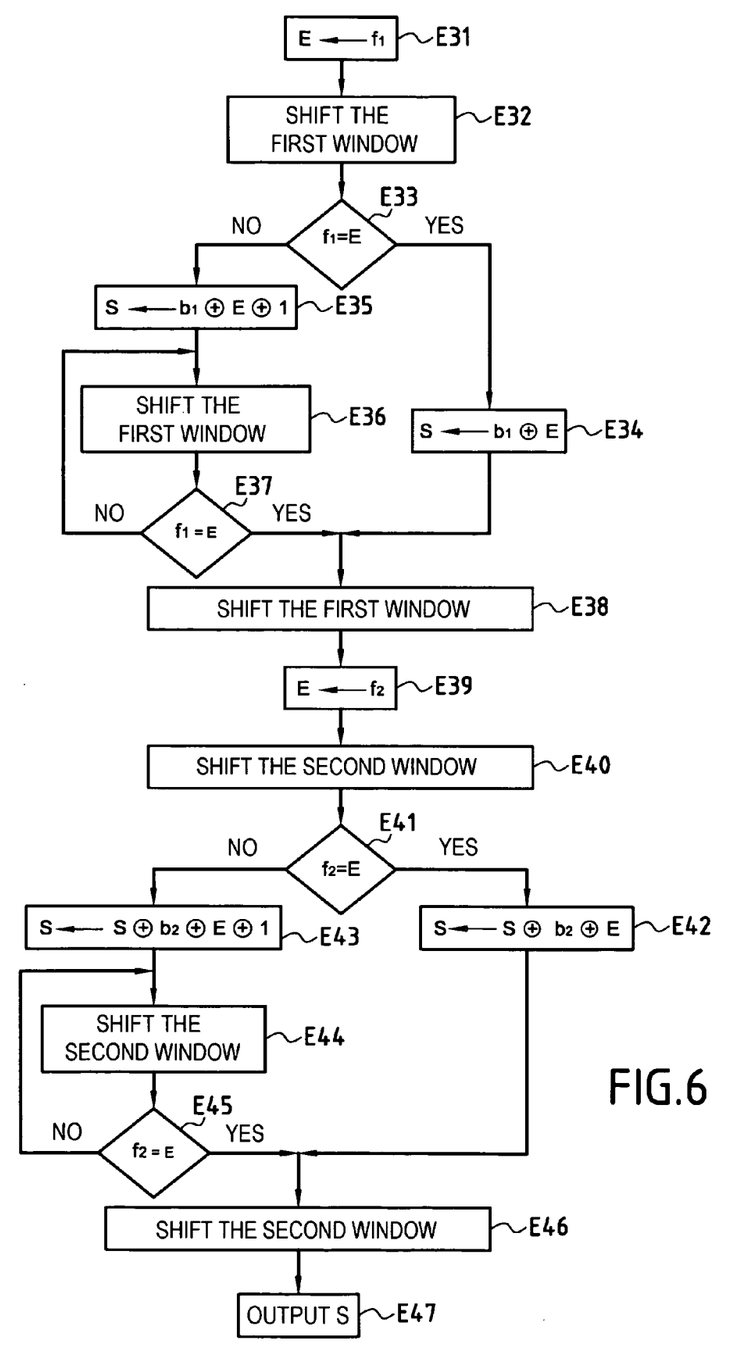

FIGS. 4 to 6 show particular implementations of the method according to the invention.

In these examples, the series of operations remains the same after each execution, the windows 19 are of "size one" (i.e. each window contains 1 bit), the set of search patterns 7 contains one search pattern, and the search pattern(s) 7 and the output pattern 25 are also of size one.

Moreover, the amplitude of shifting of the windows 19 is equal to one unit, i.e. each window 19 is shifted by one bit, from the current bit to the next bit (i.e. from left to right), on each iteration, for example.

Accordingly, each initial data sequence 9 can be read continuously, i.e. bit by bit, yielding implementations that are very simple to perform.

Below E denotes the value of the search pattern 7, s that of the output pattern 25 and f, $f_1$ and $f_2$ those of the windows 19.

Initially, the search pattern(s) 7 and the output pattern 25 are initialized by assigning an empty bit to them, i.e. E←φ and s←φ, φ being the empty set. Similarly, binary or constant values denoted b, $b_1$ and $b_2$ are defined that remain the same on each application of the series of operations of these implementations.

In the first implementation, a single window 19 is shifted over the initial data sequence 9. It may be initially fixed over the first bit of the initial data sequence 9.

The series of operations of the first implementation may be defined as follows:

set as the only rule of the first set of rules the rule $r_{1,1}$="shift one bit to the right";

set as rules of the second set of rules the following rules:

$r_{2,1}$="place the bit f from the window in the search pattern (E←f);

$r_{2,2}$="shift the window once according to $r_{1,1}$";

$r_{2,3}$="if the content of the window is equal to the bit E of the search pattern, then update the output pattern s←b";

$r_{2,4}$="if the content of the window is not equal to the bit E of the search pattern, then update the output pattern s←b⊕1";

$r_{2,5}$="while the content f of the window is not a search pattern, shift the window according to the rule $r_{1,1}$";

$r_{2,6}$="shift the window once according to $r_{1,1}$";

apply in this order the rules $r_{2,1}$, $r_{2,2}$, $r_{2,3}$, $r_{2,4}$, $r_{2,5}$ and $r_{2,6}$; and output the output pattern s.

In fact, the FIG. 4 flowchart shows the execution of the above series of operations.

The step E11 places the bit from the window 19 in the search pattern 7.

The step E12 shifts the window 19 by one bit, from the current bit to the next bit.

The step E13 is a test comparing the content of the window 19 to that of the search pattern 7.

The step E14 updates the output pattern 25 according to a first law if the content of the window 19 is equal to that of the search pattern 7. In this example, the first law corresponds to assigning the particular value b to the output pattern 25 (s←b).

The step E15 updates the output pattern 25 according to a second law if the content of the window 19 is not equal to the bit E of the search pattern 7. In this example, the second law corresponds to modulo 2 addition of the particular value b and the value 1 and assigns the result of this addition to the output pattern 25 (s←b⊕1).

The steps E16 and E17 form a loop that shifts the window 19 bit by bit toward the next bit if the content of the window 19 is equal to the bit E of the search pattern 7.

The step E18 shifts the window 19 by one bit, from the current bit to the next bit.

Finally, the step E19 outputs the output pattern from the generator 1.

Broadly speaking, the series of operations may be summarized as follows: the current bit E in the initial data sequence 9 is read and there then follows a shift to the right over the sequence 9 until the bit E is found. If the shift to find E is by only one index, then b is output, otherwise b⊕1 is output. There is then a shift of one bit to the right before restarting.

Of course, the flowchart may include a stopping test for determining if a predefined condition is met (not represented in the figure for reasons of simplification).

For example, the above steps may be repeated to form the pseudorandom data sequence until the window 19 leaves the initial data sequence 9.

FIG. 5 is a flowchart showing the execution of the series of operations of a second implementation.

The flowchart in this figure differs from that in FIG. 4 only in the steps E24 and E25.

In fact, in the step E24, the first law corresponds to effecting modulo 2 addition of the particular value b and the value E of the search pattern 7 and assigns the result of this addition to the output pattern 25 (s←b⊕E).

In contrast, in the step E25, the second law corresponds to effecting modulo 2 addition of the particular value b, the value E of the search pattern 7, and the value 1 and assigns the result of this addition to the output pattern 25 (s←b⊕E⊕1).

Accordingly, the series of operations of the second implementation may be defined as follows:
set as the only rule of the first set of rules the rule $r_{1,1}$="shift one bit to the right";
set as rules of the second set of rules the following rules:
$r_{2,1}$="place the bit f from the window in the search pattern (E←f);
$r_{2,2}$="shift the window once according to $r_{1,1}$";
$r_{2,3}$="if the content of the window is equal to the bit E of the search pattern, then update the output pattern s←b⊕E";
$r_{2,4}$="if the content of the window is not equal to the bit E of the search pattern, then update the output pattern s←b⊕E⊕1";
$r_{2,5}$="while the content f of the window is not a search pattern, shift the window according to the rule $r_{1,1}$";
$r_{2,6}$="shift the window once according to $r_{1,1}$";
apply in this order the rules $r_{2,1}$, $r_{2,2}$, $r_{2,3}$, $r_{2,4}$, $r_{2,5}$ and $r_{2,6}$; and
output the output pattern s.

Broadly speaking, the series of operations of the second implementation may be summarized as follows: the current bit E in the initial data sequence 9 is read, and there then follows a rightward shift over the sequence until the bit E is found. If the shift to find E is by only one index, then b⊕E is output; otherwise b⊕E⊕1 is output. There then follows a rightward shift of one bit before restarting.

FIG. 6 is a flowchart showing the series of operations of a third implementation.

In this third implementation, two windows 19 are shifted over the initial data sequence. A first window is initially fixed over the first bit of the initial data sequence 9 and a second window is initially fixed over the second bit of that sequence. Under such circumstances, two constants are defined, a first bit denoted $b_1$ and a second bit denoted $b_2$. The constants $b_1$ and $b_2$ have the same value 0, for example.

The step E31 places the bit from a first window in the search pattern 7.

The step E32 shifts the first window by one bit, from the current bit to the next bit.

The step E33 is a test comparing the content of the first window to that of the search pattern 7.

The step E34 updates the output pattern 25 by assigning to it the result of modulo 2 addition of a first particular value $b_1$ and the value E of the search pattern if the content of the first window is not equal to the value E of the search pattern 7 (s←$b_1$⊕E).

The step E35 updates the output pattern 25 by assigning to it the result of modulo 2 addition of the first particular value $b_1$, the value E of the search pattern 7, and the value 1 if the content of first window is not equal to the value E of the search pattern (s←$b_1$⊕E⊕1).

The steps E36 and E37 form a loop that shifts the first window bit by bit toward the next bit if the content of the first window is not equal to the bit of the search pattern 7.

The step E38 shifts the first window by one bit, from the current bit to the next bit.

The step E39 places the bit from the second window in the search pattern 7.

The step E40 shifts the second window by one bit, from the current bit to the next bit.

The step E41 is a test comparing the content of the second window to that of the search pattern 7.

The step E42 updates the output pattern 25 by assigning to it the result of modulo 2 addition of a second particular value $b_2$, the current value s of the output pattern 25, and the value E of the search pattern 7, if the content of the second window is equal to the value of the search pattern 7 (s←s⊕$b_2$⊕E).

The step E43 updates the output pattern 25 by assigning to it the result of modulo 2 addition of the current value s of the output pattern 25, said second particular value $b_2$, the value E of the search pattern 7, and the value 1, if the content $f_2$ of the second window is not equal to the value of the search pattern 7 (s←s⊕$b_2$⊕E⊕1).

The steps E44 and E45 form a loop that shifts the second window bit by bit toward the next bit if the content of the second window is not equal to the bit of the search pattern.

The step E46 shifts the second window by one bit, from the current bit to the next bit.

Finally, the step E47 outputs the output pattern 25 from the generator 1.

Accordingly, the series of operations of the third implementation may be defined as follows:
set as the only rule of the first set of rules the rule $r_{1,1}$="shift one bit to the right";
set as rules of the second set of rules the following rules:
$r_{2,1}$="place the bit $f_1$ from the window in the search pattern (E←$f_1$);
$r_{2,2}$="shift the first window once according to $r_{1,1}$";
$r_{2,3}$="if the content $f_1$ of the first window is equal to the bit E of the search pattern, then update s←$b_1$⊕E";
$r_{2,4}$="if the content of the first window is not equal to the bit E of the search pattern, then update the output pattern s←$b_1$⊕E⊕1";
$r_{2,5}$="while the content of the first window is not equal to the bit E of the search pattern, shift the first window according to the rule $r_{1,1}$";
$r_{2,6}$="shift the first window once according to $r_{1,1}$";
$r_{2,7}$="replace the value of the search pattern with the bit $f_2$ from the second window";
$r_{2,8}$="shift the second window once according to $r_{1,1}$";
$r_{2,9}$="if the content $f_2$ of the second window is equal to the bit E of the search pattern, then update the output pattern s←s⊕$b_2$⊕E";
$r_{2,10}$="if the content $f_2$ of the second window is not equal to the bit E of the search pattern, then update the output pattern s←s⊕$b_2$⊕E⊕1";
$r_{2,11}$="while the content $f_2$ of the second window is not equal to the bit E of the search pattern, shift the second window according to $r_{1,1}$";
$r_{2,12}$="shift the second window once according to $r_{1,1}$";
apply in this order the rules $r_{2,1}$ to $r_{2,12}$; and
output the output pattern s.

Broadly speaking, the third implementation amounts to adding bit by bit the outputs obtained by executing in parallel, firstly, the second implementation with the first window initially positioned over the first bit of the initial data sequence 9 and, secondly, the second implementation with the second window initially positioned over the second bit of the initial data sequence 9.

These implementations are easy to perform. Moreover, their ratio between the number of output bits and the number of bits computed is on average ⅓ if, for example, the initial means 11 providing the initial data sequence 9 is a linear feedback shift register.

Accordingly, the method according to the invention creates a pseudorandom bit sequence of good quality that can be used for symmetrical stream encryption.

In fact, each bit of the pseudorandom data sequence 3 may be combined with a corresponding bit of a data sequence of a message 45 to be encrypted by modulo 2 addition to form an encrypted data sequence 47 (see FIG. 2).

The invention claimed is:

1. A method of generating a pseudorandom data sequence by a generator device, wherein said pseudorandom data sequence is generated by a procedure for searching for a search pattern in an initial data sequence of N bits, said search procedure comprising the steps of: using the generator device to:
  (a) detect in said initial data sequence a particular search pattern of one bit that is one of a set of search patterns by moving a window of one bit over said initial data sequence;
  (b) determine an output pattern of one bit by an operation that depends on the progress of the preceding step, wherein said output pattern is determined:
    according to a first law if the window is moved only once before detecting the search pattern in the initial data sequence, wherein said first law attributes an output value to the output pattern, and
    according to a second law if the window is moved more than once before detecting the search pattern in the initial data sequence, wherein said second law attributes the result of a modulo two addition between the output value and 1 to the output pattern;
  (c) move the window by one bit, from the current bit to the next bit; and
  repeating the preceding steps (a), (b) and (c) successively to form the pseudorandom data sequence from a succession of output patterns.

2. The method according to claim 1, wherein the step of detecting said search pattern and the step of determining said output pattern are effected by a series of operations involving a first set of rules for defining a shift mode for shifting a window over said initial data sequence to detect said search pattern, said window having a particular initial position on said initial data sequence and a particular size in bits.

3. The method according to claim 2, wherein the series of operations further involves a second set of rules that determine the conditions for stopping the shifting of said window over said initial data sequence.

4. The method according to claim 3, wherein a rule from said second set of rules manages updating of said set of search patterns and/or of said output pattern as a function of the shifting and/or the content of said window.

5. The method according to claim 3, wherein said series of operations is repeated until a predetermined condition is met.

6. The method according to claim 3, wherein the series of operations is modified after each execution.

7. The method according to claim 3, wherein the series of operations remains the same after each execution and shifts a window of 1 bit over said initial data sequence continuously bit by bit to detect a search pattern of 1 bit and to determine an output pattern of 1 bit.

8. The method according to claim 1, wherein each bit of said pseudorandom data sequence is combined with a corresponding bit of a data sequence of a message to be encrypted by modulo 2 addition to form an encrypted data sequence.

9. A generator device of a pseudorandom data sequence, having a search unit which searches for a search pattern in an initial data sequence of N bits, said search unit comprising:
  a detection unit which detects in said initial data sequence a particular search pattern of one bit that is one of a set of search patterns by moving a window of one bit over said initial data sequence;
  a determination unit which determines an output pattern of one bit according to an operation that depends on the progress of the detection of said at least one search pattern, wherein said output pattern is determined:
    according to a first law if the window is moved only once before detecting the search pattern in the initial data sequence, wherein said first law attributes an output value to the output pattern, and
    according to a second law if the window is moved more than once before detecting the search pattern in the initial data sequence, wherein said second law attributes the result of a modulo two addition between the output value and 1 to the output pattern;
  a moving unit which moves the window by one bit, from the current bit to the next bit; and
  a repetition unit which generates the pseudorandom data sequence from a succession of output patterns.

10. The generator according to claim 9, wherein the detection unit includes a window adapted to be shifted over said initial data sequence and a first control unit which controls the shifting of said window over said initial data sequence.

11. The generator according to claim 9, wherein the determination unit includes a second control unit which updates said set of search patterns and/or said output pattern.

12. The generator according to claim 11, further comprising an initial unit which generates the initial data sequence of N bits.

13. The generator according to claim 12, wherein the initial unit includes a linear feedback shift register.

14. A coding device comprising an exclusive-OR logic gate and a generator device according to claim 9.

15. A secure system including at least two entities, wherein each of said at least two entities includes a coding device according to claim 14.

* * * * *